(12) United States Patent
Marx

(10) Patent No.: US 9,643,580 B2
(45) Date of Patent: May 9, 2017

(54) BRAKE SYSTEM FOR A LAND VEHICLE AND METHOD FOR CONTROLLING A BRAKE SYSTEM

(71) Applicant: Lucas Automotive GmbH, Koblenz (DE)

(72) Inventor: Andreas Marx, Kaltenengers (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 14/648,326

(22) PCT Filed: Nov. 18, 2013

(86) PCT No.: PCT/EP2013/074053
§ 371 (c)(1),
(2) Date: May 29, 2015

(87) PCT Pub. No.: WO2014/082887
PCT Pub. Date: Jun. 5, 2014

(65) Prior Publication Data
US 2015/0314763 A1   Nov. 5, 2015

(30) Foreign Application Priority Data

Nov. 29, 2012  (DE) .................. 10 2012 023 319

(51) Int. Cl.
*B60T 8/00*  (2006.01)
*B60T 13/14*  (2006.01)
(Continued)

(52) U.S. Cl.
CPC ............ *B60T 13/141* (2013.01); *B60T 8/368* (2013.01); *B60T 8/4872* (2013.01); *B60T 13/686* (2013.01)

(58) Field of Classification Search
CPC ...... B60T 8/368; B60T 8/4068; B60T 8/4872; B60T 13/141; B60T 13/142; B60T 13/148; B60T 13/586; B60T 13/686
(Continued)

(56) References Cited

U.S. PATENT DOCUMENTS

| 4,950,038 A | 8/1990 | Ocvirk et al. |
| 5,086,865 A * | 2/1992 | Tanaka ..................... B60K 6/12 180/165 |

(Continued)

FOREIGN PATENT DOCUMENTS

| DE | 3814045 A1 | 11/1989 |
| DE | 4423086 A1 | 1/1996 |

(Continued)

OTHER PUBLICATIONS

PCT International Preliminary Report on Patentability, Application No. PCT/EP2013/074053, dated Mar. 24, 2015.

(Continued)

*Primary Examiner* — Christopher Schwartz
(74) *Attorney, Agent, or Firm* — MacMillan, Sobanski & Todd, LLC

(57) ABSTRACT

A brake system for a land vehicle includes at least one wheel brake; a pump configured to pump hydraulic fluid from the inlet side of the pump to the outlet side of the pump; at least one intermediate store for receiving hydraulic fluid; a hydraulic connection between the intermediate store and the inlet side of the pump; at least one first valve arrangement for blocking a hydraulic connection between the outlet side of the pump and the at least one wheel brake; at least one second valve arrangement for blocking a hydraulic connection between the at least one wheel brake and the inlet side of the pump; and at least one third valve arrangement for blocking a hydraulic connection between the outlet side of (Continued)

the pump and the intermediate store. A method for controlling a brake system is disclosed wherein the braking pressure in at least one wheel brake is reduced by pumping the hydraulic fluid from the at least one wheel brake into the intermediate store, and the second and third valve arrangement are in a conducting position.

12 Claims, 6 Drawing Sheets

(51) Int. Cl.
      *B60T 13/68*     (2006.01)
      *B60T 8/36*     (2006.01)
      *B60T 8/48*     (2006.01)

(58) Field of Classification Search
      USPC ............ 303/9.62, 10, 11, 116.4, 119.3, 152; 180/165
      See application file for complete search history.

(56) References Cited

U.S. PATENT DOCUMENTS

| | | | | |
|---|---|---|---|---|
| 8,287,054 B2 * | 10/2012 | Beer | ................ | B60T 8/368 303/10 |
| 9,016,804 B2 | 4/2015 | Linhoff | | |
| 2008/0191549 A1 * | 8/2008 | Giering | ................ | B60T 8/368 303/116.4 |
| 2010/0187901 A1 | 7/2010 | Sonoda et al. | | |
| 2010/0276240 A1 | 11/2010 | Wuerth et al. | | |
| 2012/0049616 A1 * | 3/2012 | Park | ................ | B60T 17/04 303/9.62 |
| 2012/0161505 A1 * | 6/2012 | Koyama | ................ | B60T 1/10 303/9.62 |
| 2014/0084674 A1 * | 3/2014 | Lee | ................ | B60T 8/4068 303/6.01 |
| 2014/0361607 A1 * | 12/2014 | Marx | ................ | B60T 8/4872 303/3 |

FOREIGN PATENT DOCUMENTS

| | | |
|---|---|---|
| DE | 19960336 A1 | 6/2001 |
| DE | 102004027256 A1 | 1/2005 |
| DE | 102009039207 A1 | 3/2011 |
| WO | 2009089944 A1 | 7/2009 |
| WO | 2011134987 A1 | 11/2011 |

OTHER PUBLICATIONS

PCT International Search Report and the Written Opinion, Application No. PCT/EP2013/074053, dated Feb. 18, 2014.

* cited by examiner

BRAKE SYSTEM FOR A LAND VEHICLE AND METHOD FOR CONTROLLING A BRAKE SYSTEM

CROSS-REFERENCE TO RELATED APPLICATIONS

This application is a national stage of International Application No. PCT/EP2013/074053 filed Nov. 18, 2013, which claims priority to German Patent Application No. 10 2012 023 319.1, filed Nov. 29, 2012, the disclosures of which are incorporated herein by reference in their entirety.

BACKGROUND OF THE INVENTION

The present description relates to a vehicle brake system for a land vehicle, which for example enables regenerative braking, i.e. a braking operation, in which an electric machine converts kinetic energy of the land vehicle to electrical energy.

Vehicles as a rule have a vehicle brake system, in which for the purpose of braking a hydraulic fluid is conveyed to wheel brakes of a vehicle. Increasingly, however, vehicles also have an electric machine that is used at least as assistance to an internal combustion engine to drive the vehicle. Compared to an internal combustion engine the electric machine offers the advantage that it may be operated regeneratively during the so-called regenerative braking in order to charge a vehicle battery. The chemical energy stored in the charged battery is then used during a motorised operation of the electric machine to drive the motor vehicle.

Whereas during normal braking kinetic energy of the vehicle is converted to thermal energy because of the frictionally engaged interacting of brake shoes and brake discs at the wheel brakes, what occurs during regenerative braking is therefore a charging of the vehicle battery. Since during regenerative braking the deceleration of the motor vehicle is effected by means of the electric machine, the wheel brakes may remain unactuated. As a rule this is even desirable because any kinetic energy converted to thermal energy at the wheel brakes is no longer available for charging the vehicle battery.

So, for example the document DE 10 2009 039 207 A1 describes a regenerative vehicle brake and an operating method for a regenerative vehicle brake, which has a regeneration device that enables an asymmetric regenerative braking operation for a first and a second hydraulic brake circuit. A vehicle having such a regenerative vehicle brake comprises a generator, wherein during the regenerative braking operation a brake pressure build-up at wheel brakes of the first brake circuit occurs at least in a reduced manner and a brake pressure build-up at wheel brakes of the second brake circuit occurs in a substantially unreduced manner. For this purpose the regeneration device comprises at least delay devices.

The vehicle brake described in document DE 10 2009 039 207 A1 however comprises more components than conventional brake systems. These additional components take up additional installation space and increase the system weight. What is more, pedal-reaction simulating devices that are used with regenerative vehicle brakes often entail a more complicated control of the brake system or exhibit partially an unsatisfactory control quality.

It would moreover be desirable for the vehicle brake system to be suitable for conventionally braked land vehicles and regeneratively braked land vehicles, or to be at least relatively easily adaptable to the respective requirements.

BRIEF SUMMARY OF THE INVENTION

A feature of the invention is therefore to provide a vehicle brake system that is of a simple design and is cost-effective to manufacture. The brake system is moreover to exhibit a high control quality in order to impart to the driver a comfortable braking response and braking sensation.

In order to implement the feature, a brake system for a land vehicle is proposed. The brake system enables a regenerative braking operation and comprises at least one wheel brake that is to be assigned to a wheel of the land vehicle; a pump having a variable capacity that is devised to deliver hydraulic fluid from its input side to its output side; at least one accumulator for receiving hydraulic fluid; a hydraulic connection between the accumulator and the input side of the pump; at least one first valve arrangement for blocking a hydraulic connection between the output side of the pump and the at least one wheel brake; at least one second valve arrangement for blocking a hydraulic connection between the at least one wheel brake and the input side of the pump; and at least one third valve arrangement for blocking a hydraulic connection between the output side of the pump and the accumulator.

By means of the hydraulic connection between the output side of the pump and the accumulator, which is blockable by means of the third valve arrangement and may also be referred to as the accumulator feed line, the pump may deliver the hydraulic fluid from the wheel brakes directly into the accumulator. As a result of this volume displacement brake pressure in the wheel brakes may be reduced. When the third valve arrangement is situated in blocking position, the hydraulic fluid may be delivered from the accumulator into the wheel brakes. As a result of the volume displacement from the accumulator to the wheel brakes, the brake pressure in the wheel brakes may be increased. The switching positions of the valve arrangements for pressure build-up and pressure reduction may in this case differ from one another merely in the switching position of the third valve arrangement. Thus, when the third valve arrangement is open, brake pressure in the wheel brakes may be reduced and, when the third valve arrangement is closed, brake pressure in the wheel brakes may be built up.

The pressure build-up and the pressure reduction are determined in particular by the volume displacement between wheel brakes and accumulator, wherein the speed of the volume displacement is in turn determined by the volumetric capacity of the pump. Consequently, by controlling the volumetric capacity of the pump the pressure reduction and the pressure build-up may be controlled precisely, thereby resulting in a comfortable braking sensation for the driver.

In order to solve the problem a hydraulic unit is moreover proposed, in which the pump and the first, second and third valve arrangements of the brake system are accommodated.

Furthermore, in order to solve the problem a method of controlling a brake system is proposed. In the method the brake pressure in at least one wheel brake is reduced by delivering hydraulic fluid from the at least one wheel brake into the accumulator. For this, at least one second valve arrangement for blocking a hydraulic connection between the at least one wheel brake and an input side of a pump, which is provided for delivering the hydraulic fluid, is situated in let-through position. At least one third valve arrangement for blocking a hydraulic connection between an output side of the pump and the accumulator is situated likewise in let-through position. This method may be used for example during a regenerative braking operation. Preferably while in an electric machine of the land vehicle a regenerative braking torque is built up in order to convert kinetic energy of the land vehicle to electrical energy.

For an embodiment of the brake system that permits regenerative braking use is made for example of a control unit that during a regenerative braking operation is devised to select switching positions for the valve arrangements in such a way and to activate the pump in such a way that the pump delivers hydraulic fluid from the at least one wheel brake to the accumulator, while in an electric machine of the land vehicle a regenerative braking torque is built up in order to convert kinetic energy of the land vehicle to electrical energy.

The control unit may be devised to select the volumetric capacity of the pump and the switching positions of the valve arrangements in such a way that at any time the sum of regenerative braking torque and the braking torque of the at least one wheel brake remains constant or within a tolerance limit that is to be selected. For example, the control unit may select the rotational speed of the pump by means of a pulse width modulation (PWM) signal. For this purpose the control unit may comprise a series-connected speed regulating rheostat and speed controller for controlling the rotational speed.

The control unit may further be devised to vary the volumetric capacity of the pump in order to compensate fluctuations of the regenerative braking torque. A fluctuation of the regenerative braking torque may comprise for example a fall followed by a rise in the regenerative braking torque. To compensate a fall in the regenerative braking torque the control unit may increase the volumetric capacity of the pump. For this purpose the control unit may close the third valve arrangement. To compensate the rise in the regenerative braking torque the control unit may moreover continue to select an increased rotational speed, so that during the drop and during the rise in the regenerative braking torque the rotational speed is constant or approximately constant. For this purpose the control unit may re-open the third valve arrangement. During the compensation of the fluctuation of the regenerative braking torque the first and second valve arrangements may be open throughout.

A first shut-off valve may be provided for blocking a hydraulic connection between the accumulator and the at least one second valve arrangement at least in the direction from the at least one second valve arrangement to the accumulator. As a result the hydraulic fluid flowing back from the wheel brakes cannot flow directly into the accumulator. The first shut-off valve may moreover be provided for blocking the hydraulic connection between the accumulator and the input side of the pump, which may also be referred to as the accumulator return line, at least in the direction from the input side of the pump to the accumulator. The first shut-off valve may be for example a non-return valve.

At least one fourth valve arrangement may be provided for blocking a hydraulic connection between a master cylinder and the at least one wheel brake. The control unit may select the switching position of the at least one fourth valve arrangement in such a way that an actuation of a brake pedal of the land vehicle leads to a volume displacement from the master cylinder to the at least one wheel brake, and that during the build-up of the regenerative braking torque the at least one fourth valve arrangement blocks the hydraulic connection between the master cylinder and the at least one wheel brake.

Parallel to the one fourth valve arrangement a second shut-off valve may be provided. The second shut-off valve may be devised, when the fourth valve arrangement is closed, to enable a volume displacement between the master cylinder and the wheel brakes provided that the pressure in the master cylinder exceeds the initial tension of the second shut-off valve. The second shut-off valve may be a non-return valve.

The control unit may select the switching position of the valve arrangements in such a way that the delivery of the pump in one switching position of the valve arrangements leads to a reduction of the brake pressure in the at least one wheel brake and in another switching position of the valve arrangements leads to an increase of the brake pressure in the at least one wheel brake. The two switching positions may in this case differ from one another merely in the switching position of the third valve arrangement. The switching positions may be the second and third switching position of the valve arrangements.

In a method of controlling a brake system during a regenerative braking operation the first shut-off valve during the reduction of the brake pressure in the at least one wheel brake may open if the brake pressure in the at least one wheel brake falls below a predetermined pressure.

Furthermore, the second shut-off valve may open if the brake pressure in the master cylinder exceeds a predetermined pressure. Subsequently or simultaneously the control unit may activate the valve arrangements in such a way that the first valve arrangement is situated in let-through position and the second and third valve arrangement are situated in blocking position. The control unit may moreover reduce the volumetric capacity of the pump to zero.

Finally, if the speed of the land vehicle falls below an adjustable threshold value, the brake system may be controlled in such a way that the third valve arrangement is situated in blocking position and the pump delivers hydraulic fluid. The delivery of the pump may in this case lead to a volume displacement from the accumulator to the wheel brakes. At the same time the regenerative braking torque may be reduced again. As soon as the regenerative braking torque has been reduced to zero and/or the brake pressure in the wheel brakes has reattained the value selected by the driver, the fourth valve arrangement may be opened again.

Other advantages of this invention will become apparent to those skilled in the art from the following detailed description of the preferred embodiments, when read in light of the accompanying drawings.

BRIEF DESCRIPTION OF THE DRAWINGS

Figure 1:
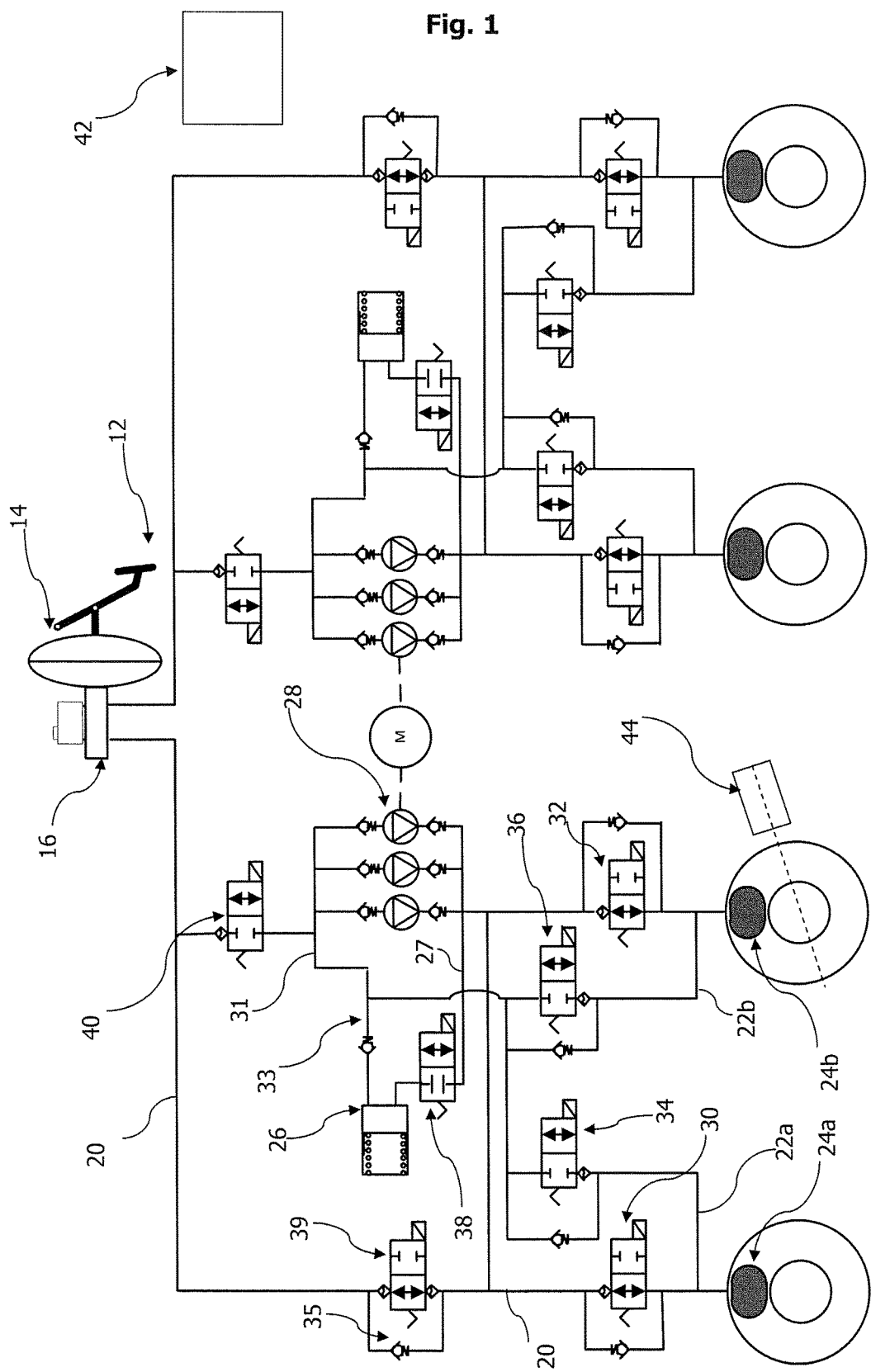
FIG. 1 shows a schematic representation of a vehicle brake system.

In the following, embodiments of a vehicle brake system 10 that enables regenerative braking are described. Here, in the figures matching elements are denoted by the same reference characters.

FIGS. 1 to 4 show a vehicle brake system 10 of a land vehicle that enables for example regenerative braking. The vehicle brake system 10 comprises two brake circuits, wherein in the following the vehicle brake system is described with reference to one brake circuit. What is stated about the components of this brake circuit applies in a corresponding manner to the other brake circuit.

The vehicle brake system 10 shown in FIGS. 1 to 4 comprises a brake pedal 12, which is connected by a brake booster 14 to a master cylinder 16. The master cylinder 16 is connected to a brake fluid container 18, in which the hydraulic fluid is stored. By the feed line 20 and by first valve arrangements 30, 32 as well as fourth valve arrangement 39 the first brake circuit is connected to the wheel brakes 24a and 24b. From the wheel brakes 24a and 24b return lines 22a and 22b lead via second valve arrangements 34 and 36 to an input side of a pump 28. At the input side of the pump 28 a fifth valve arrangement 40 is provided, wherein the input side of the pump 28 is connectable by the fifth valve arrangement 40 to the brake fluid container 18. By opening the fifth valve arrangement 40 the pump 28 may take in hydraulic fluid from the fluid container 18. The output side of the pump 28 is connected to the feed line 20 and hence to the first valve arrangements 30 and 32. The pump may be a radial piston pump, the volumetric capacity of which is variable.

The illustrated brake system 10 further comprises an accumulator 26. The accumulator 26 is provided for provisionally receiving hydraulic fluid. The illustrated accumulator 26 has a first and a second port. The accumulator 26 may be a low-pressure accumulator. The output side of the pump 28 is connected by an accumulator feed line 27 to the accumulator 26. A third valve arrangement 38 is provided for selectively blocking or opening the accumulator feed line 27 between the output side of the pump 28 and the accumulator 26.

An accumulator return line 31 connects the accumulator, more precisely the second port of the accumulator 26, to the input side of the pump 28. In the accumulator return line 31 a first shut-off valve 33 is provided. The first shut-off valve 33 may be a non-return valve. The let-through direction of the first shut-off valve 33 is from the accumulator 26 to the input side of the pump 28. Thus, the first shut-off valve 33 allows the emptying of the accumulator 26 towards the input side of the pump 28 and prevents a filling of the accumulator 26, for example by the hydraulic fluid that is flowing back from the wheel brakes 24a, 24b through the return lines 22a, 22b. In a corresponding manner the accumulator 26 may be filled only when the third valve arrangement 38 is situated in let-through position.

The first to fifth valve arrangements 30, 32, 34, 36, 38, 39, 40 may be for example electromagnetically actuable 2/2-way valves. The first and fourth valve arrangements 30, 32, 39 are valve arrangements that are open in normal position and which in normal position (non-energized) allow hydraulic fluid to flow through. The second, third and fifth valve arrangements 34, 36, 38, 40 are valve arrangements that are closed in normal position and which in normal position (non-energized) prevent hydraulic fluid from flowing through. It is however equally possible to use other valves to achieve the same effect. Furthermore, the first, second and fourth valve arrangements 30, 32, 34, 36 and 39 are bridged in each case by a non-return valve, which is used for pressure limitation. At this point only the non-return valve of the fourth valve arrangement 39 is highlighted. This non-return valve may also be referred to as second shut-off valve 35.

In FIG. 1 a control unit 42 is additionally represented. The control unit 42 is connected in an electrically conductive manner to the valve arrangements and is devised to select switching states for the valve arrangements. The control unit 42 is also connected in an electrically conductive manner to a motor of the pump 28 and is devised to select the volumetric capacity of the pump 28. The control unit 42 may for example emit a pulse width modulation signal (PWM signal) and thereby select the rotational speed of the pump 28. For the sake of clarity the respective electrical connections are not illustrated.

In FIG. 1 moreover an electric machine 44 is indicated. The electric machine 44 is devised to convert kinetic energy of the land vehicle to electrical energy during a deceleration operation. The electric machine 44 therefore produces a regenerative braking torque. The electric machine 44 may be part of the drive train of the land vehicle. Equally the electric machine may be a generator, which independently of the drive train is coupled to the wheels of the land vehicle and is provided especially for converting kinetic energy to electrical energy.

A pedal position transducer for detecting the actuation of the brake pedal 12 may further be disposed on the brake pedal 12. For the sake of clarity further components of a hydraulic vehicle brake system are not represented. A vehicle brake system may comprise further components, such as for example sensors, wherein these are not necessarily required to understand the present vehicle brake system.

Figure 2:
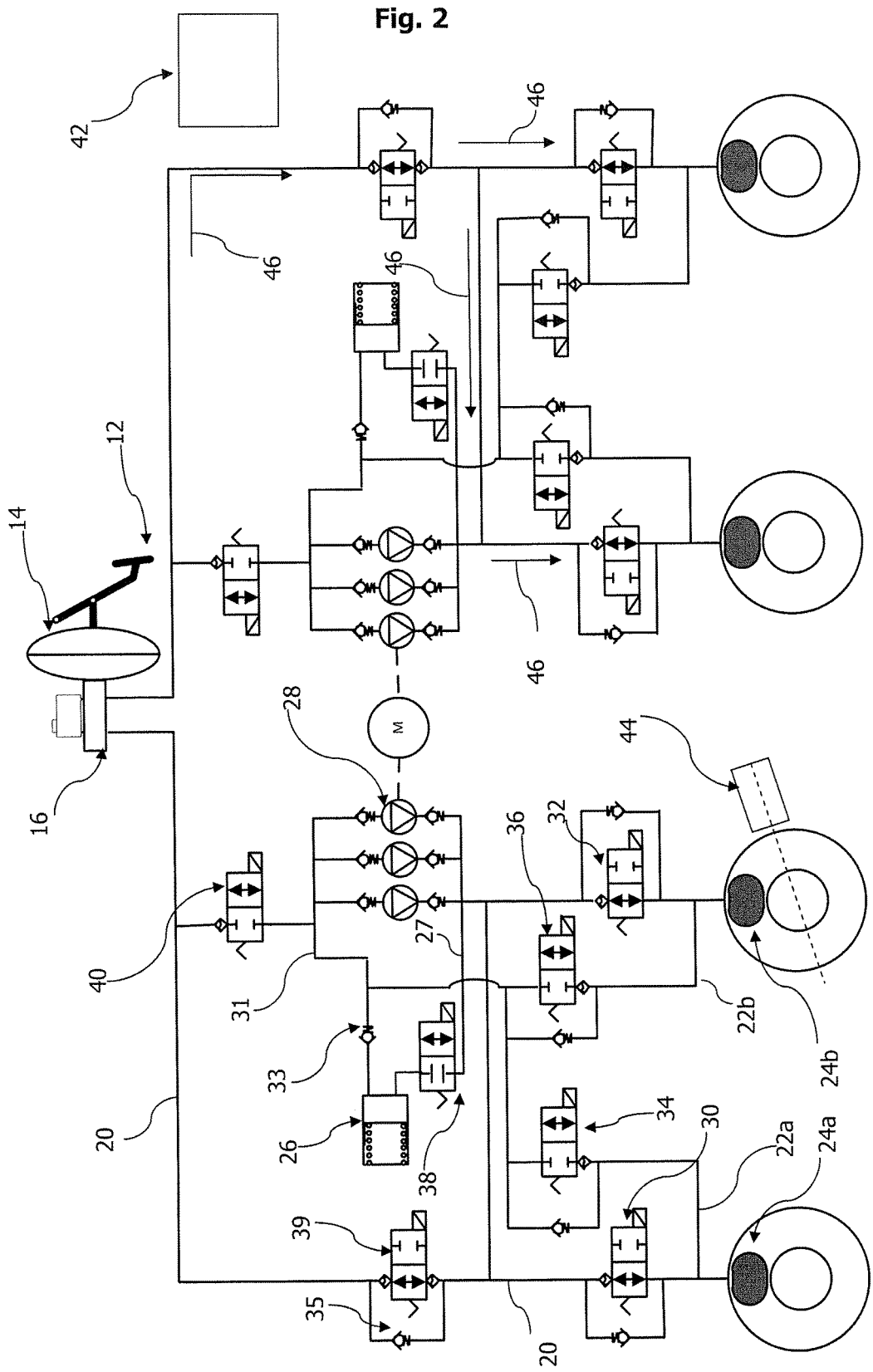
FIG. 2 shows a schematic representation of a vehicle brake system in a first state.

FIG. 2 shows a schematic representation of the vehicle brake system 10, wherein the valve arrangements are situated in a first switching position. The thus represented state of the vehicle brake system 10 corresponds to the second section II. of FIG. 5. In the first switching state of the valve arrangements that is represented in FIG. 2 the first and fourth valve arrangements 30, 32, 39 are situated in let-through position and the second and third valve arrangements 34, 36, 38 are situated in blocking position.

If the driver actuates the brake pedal 12, then via the open first and fourth valve arrangements 30, 32, 39 hydraulic fluid corresponding to the driver braking request based on the position of the brake pedal 12 is fed from the brake fluid container 18 by means of the master cylinder 16. The arrows 46 indicate the feed of hydraulic fluid.

The build-up of the brake pressure therefore occurs in the same manner as for a purely hydraulic braking operation. The natural pedal reaction, the noise level and the deceleration effect characteristic of a conventional braking apparatus may therefore be maintained.

Figure 3:
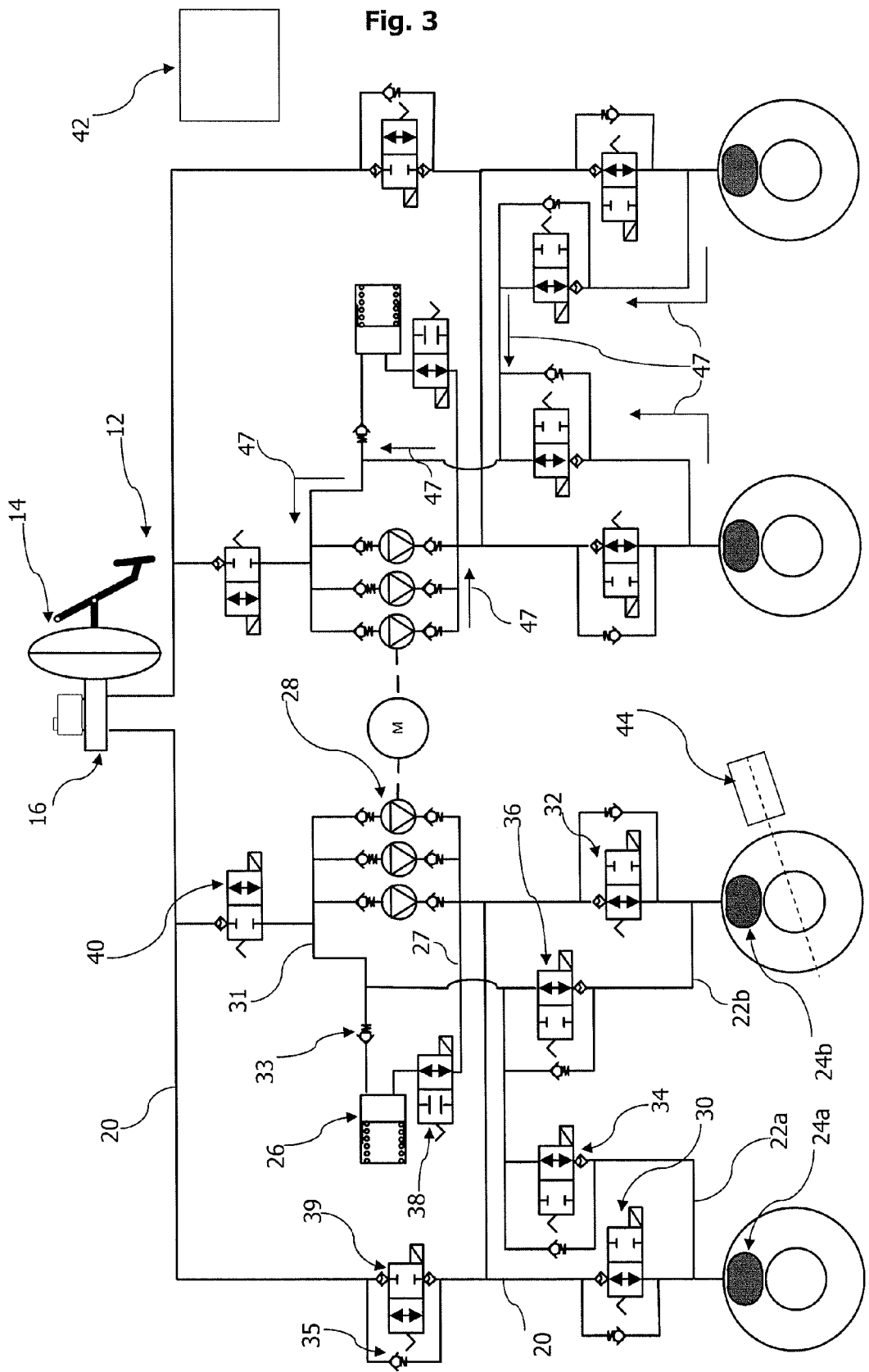
FIG. 3 shows a schematic representation of a vehicle brake system in a second state.

FIG. 3 shows a schematic representation of the vehicle brake system 10, wherein the valve arrangements are situated in a second switching position. The illustrated state corresponds to the third section III. of FIG. 5.

If a pressure build-up of the hydraulic fluid has been effected and no further actuation of the brake pedal 12 by the driver occurs, i.e. the brake pedal 12 is held in an actuation position, the fourth valve arrangement 39 is closed by the control unit 42 and the second and third valve arrangements

34, 36, 38 are opened by the control unit 42. The control unit 42 moreover controls the pump 28 in such a way that it takes in hydraulic fluid from the wheel brakes 24a, 24b through the open second valve arrangements 34, 36 at the input side of the pump 28 and feeds it through the output side of the pump 28 and the third valve arrangement 38 to the accumulator 26 in order to reduce the pressure prevailing at the wheel brakes 24a, 24b as a result of the actuation of the brake pedal 12. The arrows 47 show the feed of hydraulic fluid from the wheel brakes 24a, 24b via the pump 28 to the accumulator 26. The first valve arrangement 30, 32 in this case may be situated in blocking position or, as represented in FIG. 3, in let-through position.

As soon as the brake pressure as a result of the volume displacement into the accumulator 26 falls below a specific value that corresponds to the initial tension of the first shut-off valve 33, the first shut-off valve 33 opens. The pump 28 may therefore take in hydraulic fluid from the accumulator 26. Since the pump 28 continues to deliver the hydraulic fluid into the accumulator 26, the hydraulic fluid, after the first shut-off valve 33 has opened, is merely circulated.

As a result of the closed fourth valve arrangement 39 the pressure between the fourth valve arrangement 39 and the master cylinder 16 and/or the brake pedal 12 remains constant, with the result that the driver does not notice any change.

Figure 4:
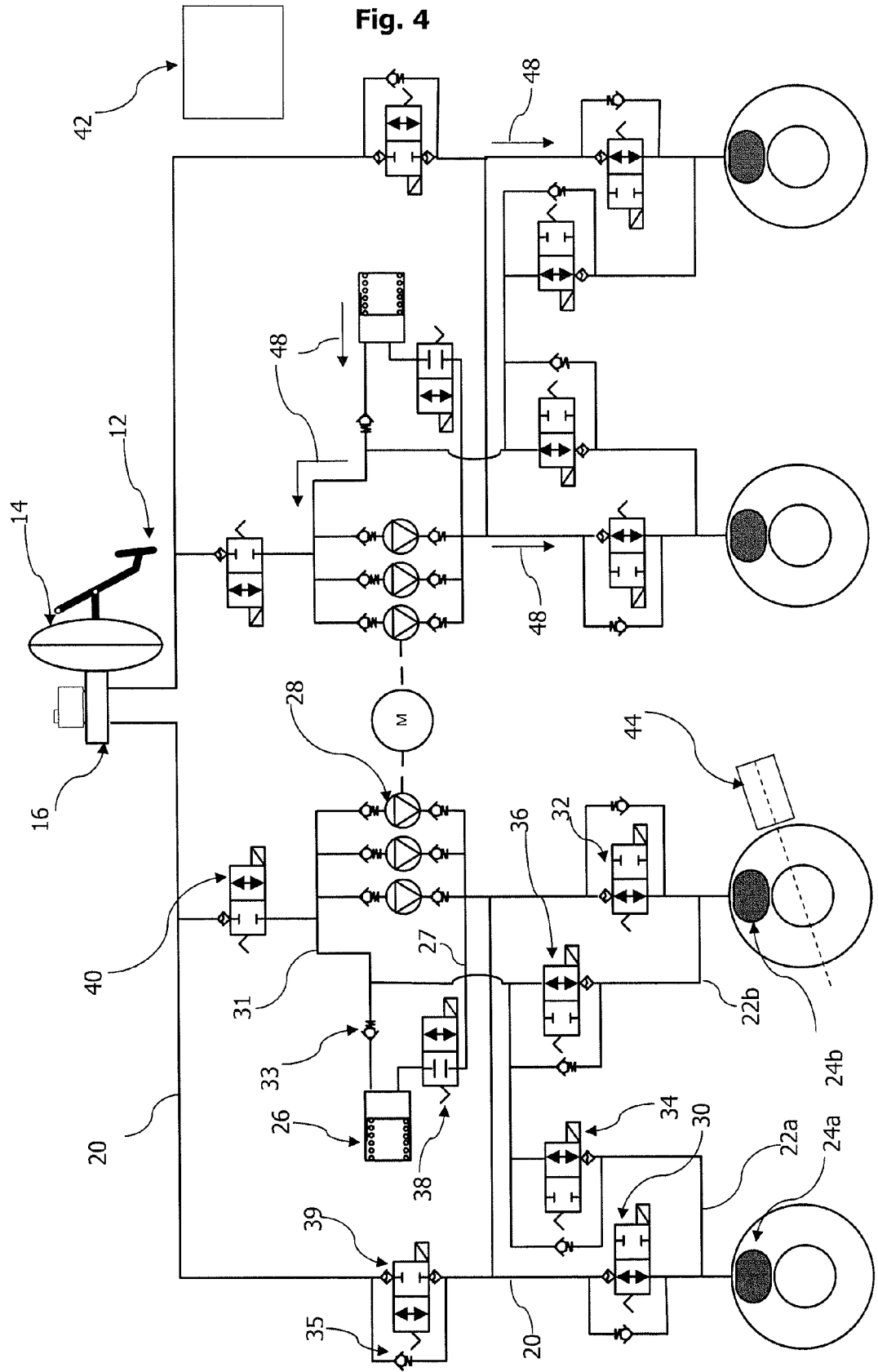
FIG. 4 shows a schematic representation of a vehicle brake system in a third state.

FIG. 4 shows a schematic representation of the vehicle brake system 10, wherein the valve arrangements are situated in a third switching state. The represented state corresponds to the seventh section VII. of FIG. 5.

In the third switching state the first valve arrangements 30, 32 are situated in let-through position and the third valve arrangement 38 is situated in blocking position. The pump 28 delivers hydraulic fluid from the accumulator 26 into the wheel brakes 24a, 24b. By means of the volumetric capacity of the pump 28 the speed of the volume displacement may be adjusted. Thus, a higher volumetric capacity of the pump may bring about a faster pressure build-up in the wheel brakes 24a, 24b. The second valve arrangements 34, 36 in this case may be situated in blocking position or, as represented in FIG. 4, in let-through position. The arrows 48 indicate the volume displacement from the accumulator 26 to the wheel brakes 24a, 24b.

Figure 5:
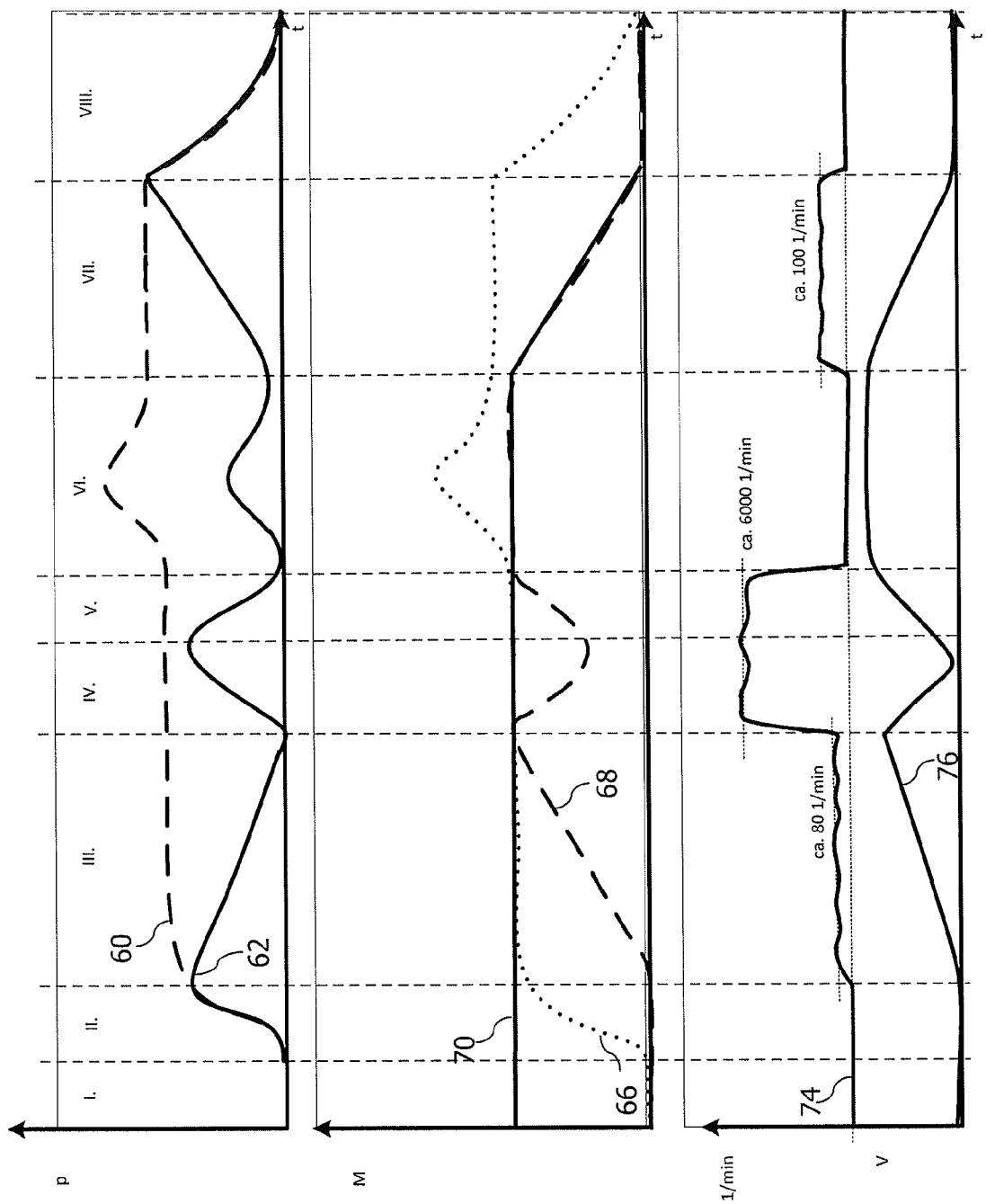
FIG. 5 shows characteristics of the pressure of the hydraulic fluid, of a braking torque, of a filling of the accumulator and of a pump rotational speed over time.

The top diagram of FIG. 5 shows the characteristic of the hydraulic fluid pressure in a purely hydraulic vehicle brake system/during a purely hydraulic braking operation and during a regenerative braking operation over time. The line 60 shows the pressure characteristic of the hydraulic fluid during a purely hydraulic braking operation and the line 62 shows the pressure characteristic of the hydraulic fluid during a regenerative braking operation.

The middle diagram of FIG. 5 shows the total braking torque of the land vehicle, i.e. the combined braking torque 66 of the wheel brakes 24a, 24b and the electric machine 44. The middle diagram further shows the braking torque 68 of the electric machine 44, as well as the braking capacity 70 of the electric machine 44. The bottom diagram of FIG. 5 shows the rotational speed characteristic 74 of the pump 28 and the characteristic 76 of the hydraulic fluid volume received in the accumulator 26.

The characteristics as well as the further representations in FIG. 5 are divided into eight sections, wherein the first section I. represents the state, in which there is no actuation of the brake pedal 12 and so the vehicle brake system 10 is inactive.

The second section II. represents the state, in which the brake pedal 12 is actuated and a braking operation is initiated. The valve arrangements in this case are situated in the first switching position represented in FIG. 2. In this switching position the pressure build-up in the wheel brakes is effected in a comparable manner to how it is effected during a purely hydraulic braking operation.

In the third section III. the valve arrangements are situated in the second switching position represented in FIG. 3. The third section III. represents the state, in which the pressure of the hydraulic fluid, given constant deflection of the brake pedal 12, during a purely hydraulic braking operation is held substantially at a constant level, and during a regenerative braking operation, as described here, is gradually reduced. While the brake pressure 62 in the wheel brakes 24a, 24b is being reduced, in the electric machine 44 of the land vehicle a regenerative braking torque 68 is being built up. Thus, in the third section III. regenerative braking torque 68 is being faded in and the braking torque of the vehicle brake system 10 is being faded out. This operation may also be referred to as "blending". The transition from the hydraulic braking by the wheel brakes 24a, 24b to the regenerative braking by the electric machine 44 in this case is effected gradually. The change from purely hydraulic braking to purely regenerative braking may be effected successively, i.e. a continuous rise and/or fall as represented in the figures, or alternatively in steps and/or stages. An exponential rise and/or fall would moreover also be possible.

The control unit 42 or a control device specially associated with the electric machine 44 may in this case control the extent, to which the electric machine 44 is operated regeneratively to achieve a braking at the wheels of the vehicle. The control unit 42 moreover controls the extent, to which hydraulic fluid is delivered from the wheel brakes 24a, 24b into the accumulator 26. Since the pressure reduction in the wheel brakes 24a, 24b results in particular from a volume displacement of hydraulic fluid from the wheel brakes 24a, 24b to the accumulator 26 and the speed of the volume displacement is determined by the volumetric capacity of the pump 28, the reduction of the braking torque of the wheel brakes 24a, 24b may be selected by means of the control unit 42. For example, the control unit 42 may, as represented in the bottom diagram of FIG. 5, select for the pump 28 a rotational speed of approximately 80 revolutions per minute. The exact rotational speed of the pump 28 in this case depends upon the respective braking operation and the parameters of the brake system. It should however be stressed that the pump for fading out the brake pressure is operated in the partial load range.

The volumetric capacity of the pump 28 may be selected by the control unit 42 for example by means of a PWM signal. Furthermore, [through] the use of series-connected controllers, such as for example a series-connected speed regulating rheostat and speed controller, a high control quality of the pump rotational speed may be achieved. The volumetric capacity of the pump 28 may accordingly be selected very precisely by the control unit 42.

Thus, through control of the volumetric capacity of the pump 28, for example by virtue of the selection of a rotational speed in the form of a PWM signal, the fading-out of the braking torque of the wheel brakes 24a, 24b may be adapted very precisely to the fading-in of the regenerative braking torque 68. In this case, at any time the total braking torque 66 achieved at a wheel of the vehicle is held constant or at least within a tolerance range that is to be selected. The tolerance range may be selected for example in such a way that braking torque deviations that cannot be perceived by the driver are permissible. The total braking torque may therefore correspond to the braking request selected by the driver via the position of the brake pedal 12. By virtue of the precise selection of the rotational speed the differences between a purely hydraulic braking operation and a regenerative braking operation that are perceivable by the driver may be minimized, thereby imparting to the driver a comfortable braking sensation.

In this case by means of further devices, such as sensors and the like, that are used in any case in the vehicle, the control unit 42 may determine the extent of the braking by the electric machine 44 and the brake pressure 62 at the wheel brakes 24a, 24b and may be used to determine the requisite pump rotational speed.

In the fourth section IV. and the fifth section V. a fluctuation of the braking torque of the electric machine 44 is represented. Such fluctuations may be caused for example by the driver or an automatic transmission changing down, i.e. selecting a lower gear. In the fourth section IV., therefore, the regenerative braking torque 68 clearly falls and then rises again in the fifth section V.

In the case of a purely hydraulic braking operation a gear change has no effect upon the characteristic of the hydraulic brake pressure. As a result, the pressure characteristic represented by the shape of the line 60 remains unchanged. In the case of a regenerative braking operation, however, the fluctuations of the regenerative braking torque 68 of the electric machine 44 have to be compensated. And so, as is represented in the top diagram of FIG. 5, the brake pressure 62 in the wheel brakes 24a, 24b may be increased in the fourth section IV. and reduced again in the fifth section V. in order to compensate the fluctuations of the regenerative braking torque 68.

The rise of the brake pressure 62 in the fourth section IV. is controlled by the control unit 42. The control unit 42 therefore activates at least the third valve arrangement 38 in such a way that it is situated in blocking position. The control unit 42 may moreover select for example a higher rotational speed for the pump 28. For example a rotational speed of 6000 revolutions per minute may be selected for the pump 28. This may correspond to the maximum rotational speed of the pump 28 or, in other words, the pump 28 is operated in the full load range. By means of a higher rotational speed of the pump 28 the volumetric capacity of the pump 28 may be increased. A higher volumetric capacity in turn leads to a faster volume displacement and hence to a faster pressure rise in the wheel brakes 24a, 24b. Because of the volume displacement from the accumulator 26 to the wheel brakes 24a, 24b the hydraulic fluid volume 76 received in the accumulator 26 sharply decreases, as represented in the bottom diagram of FIG. 5.

The reduction of the brake pressure 62 in the fifth section V. is likewise controlled by the control unit 42. The control unit 42 therefore activates at least the third valve arrangement 38 in such a way that it is situated in let-through position. The control unit 42 moreover selects a rotational speed for the pump 28. This may for example correspond approximately to the rotational speed selected for the fourth section IV.

The selected switching state of the valve arrangements and the volumetric capacity of the pump lead to a volume displacement from the wheel brakes 24a, 24b to the accumulator 26. The hydraulic fluid volume 76 received in the accumulator 26 accordingly rises again, as is represented in the bottom diagram of FIG. 5.

In the sixth section VI., in the case of a purely hydraulic braking operation, upon a further actuation of the brake pedal 12 additional hydraulic fluid is fed to the wheel brakes, wherein the pressure in the brake lines of the vehicle brake system and/or the brake pressure 60 at the wheel brakes correspondingly increases.

In the case of a regenerative braking operation, the fourth valve arrangement 39 is opened by the control unit 42. As a result, a quantity of hydraulic fluid corresponding to the further actuation may flow from the master cylinder 16 to the wheel brakes 24a, 24b. The additional quantity of hydraulic fluid then brings about a rise of the brake pressure 62 and hence of the braking torque of the wheel brakes 24a, 24b. If the driver then reduces the pressure on the brake pedal 12, i.e. if the brake pedal 12 is actuated to a lesser extent by the driver, the brake pressure 62 correspondingly reduces, wherein hydraulic fluid flows from the wheel brakes 24a, 24b back to the master cylinder 16. Provided the fourth valve arrangement 39 should already be closed upon the reduction of the brake pressure by the driver, the pressure reduction may also be effected by means of the pump 28 and a volume displacement from the wheel brakes 24a, 24b to the accumulator 26.

While the fourth valve arrangement 39 is open, and during the further actuation of the brake pedal 12 by the driver, the volumetric capacity or more precisely the rotational speed of the pump 28 may be reduced to zero, as is represented in the bottom diagram of FIG. 5. Furthermore, the second valve arrangement 34, 36 may be closed by means of the control unit 42, so that in the sixth section VI. the further actuation of the brake pedal 12 has a similar effect to that in a purely hydraulic vehicle brake system.

Alternatively the volume displacement between master cylinder 16 and the wheel brakes 24a, 24b may be effected by means of the second shut-off valve 35. For this, however, the pressure in the master cylinder 16 must exceed the initial tension of the second shut-off valve 35.

In the example represented in FIG. 5 the brake pressure 60 remains slightly above the brake pressure originally set by the driver. Since the braking request selected by the driver now exceeds the braking capacity 70 of the electric machine 44, the control unit controls the brake system in such a way that after the further actuation of the brake pedal 12 a low residual pressure 62 remains in the wheel brakes 24a, 24b, so that the total braking torque 66 corresponds to the braking request selected by the driver.

The seventh section VII. corresponds to the third switching position of the valve arrangements represented in FIG. 4 and shows the state of a regenerative vehicle brake system, in which with decreasing vehicle speed the pressure in the brake lines of the vehicle is gradually built up again in order to achieve a brake pressure at the wheel brakes 24a, 24b. In the purely hydraulic vehicle brake system, on the other hand, the pressure 60 is still at the same level as after the increase of the pressure as a result of the further actuation of the brake pedal 12.

If the vehicle speed decreases because of the braking of the vehicle, the braking power made available by the electric machine 44 also reduces. The third valve arrangement 38 is therefore closed by the control unit 42 and hydraulic fluid is fed from the accumulator 26 by means of the pump 28 gradually to the wheel brakes 24a, 24b, so that once more a hydraulic braking effect corresponding to the driver braking request arises at the wheels of the vehicle. At the same time the regenerative braking of the wheels provided by the electric machine is gradually reduced. In this case, the pump 28 and the electric machine 44 are controlled in such a way that a gradual change from the purely regenerative braking to the purely hydraulic braking occurs, wherein the total braking torque 66 at the wheels of the vehicle is at any time held constant or at least within a tolerance range, which is to be selected, by virtue of a corresponding control by means of the control unit 42. The tolerance range in this case may be selected in such a way that variations within the tolerance range cannot be perceived by the driver. The characteristic of the total braking torque 66, provided by the vehicle brake system 10 and the regeneratively operated electric machine 44, therefore corresponds to the braking torque characteristic of a purely hydraulic vehicle brake system.

As is represented in the bottom diagram of FIG. 5, in the seventh section VII. a volume displacement is effected from the accumulator 26 via the pump 28 to the wheel brakes 24*a*, 24*b*. The hydraulic fluid volume received in the accumulator 26 correspondingly decreases. To build up the brake pressure at the wheel brakes 24*a*, 24*b* the control unit 42 selects a rotational speed for the pump 28. The rotational speed of the pump 28 may be for example approximately 100 revolutions per minute and may lie in the partial load range of the pump 28.

As a result of the volume displacement from the accumulator 26 to the wheel brakes 24*a*, 24*b* the braking torque of the wheel brakes 24*a*, 24*b* rises. In a comparable manner to that in the third section III., the control unit 42 may control the pressure build-up by means of the volumetric capacity of the pump 28. Whether the brake pressure is built up or reduced arises merely from the switching position of the third valve arrangement 38. If it is situated in let-through position, the pump 28 delivers into the accumulator 26, so that brake pressure is reduced. If it is situated in blocking position, the pump 28 delivers from the accumulator 26, so that brake pressure is built up.

The eighth section VIII. represents the state, in which the driver reduces the pressure upon the brake pedal. Since in the preceding seventh section VII. the brake pressure in the wheel brakes 24*a*, 24*b* was raised once more to the level of the purely hydraulic braking operation, as a result of the opening of the fourth valve arrangement 39 a pedal reaction as in a purely hydraulic braking operation may be imparted to the driver. After the vehicle has been sufficiently decelerated or is at a standstill, the driver may accordingly reduce the brake pressure in the conventional manner. As the fourth valve arrangement 39 is open, the hydraulic fluid may flow back to the brake fluid container 18 and/or to the master cylinder 16.

Figure 6:
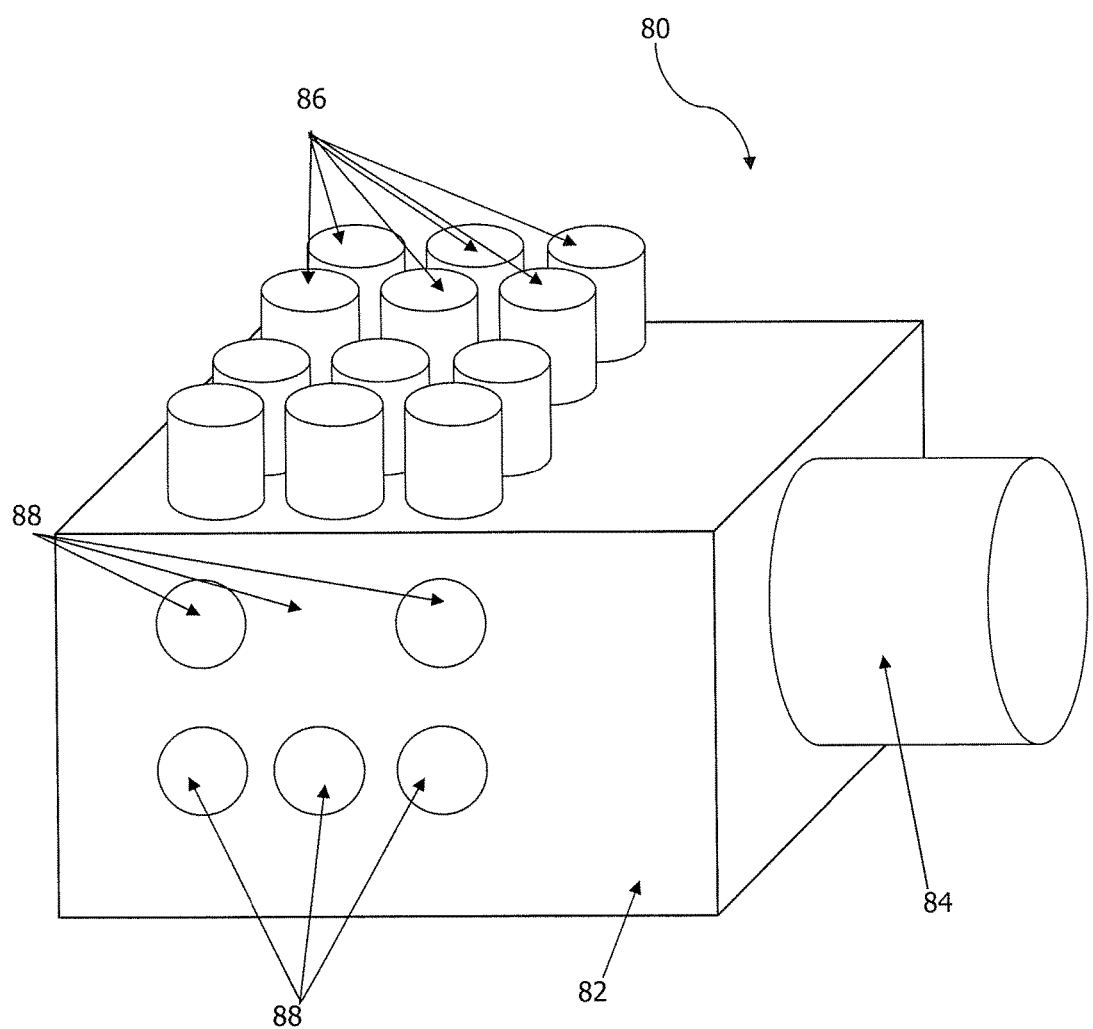
FIG. 6 shows a schematic representation of a hydraulic unit.

FIG. 6 is a schematic representation of a hydraulic unit 80. The hydraulic unit 80 comprises a metal body 82, which may be manufactured for example from aluminium. Inside the metal body 82 at least the pump 28, the first, second and third valve arrangements 30, 32, 34, 36, 38 are accommodated. In FIG. 6 only the motor 84 of the pump 28 and the coil forms 86 for actuating the valves are visible. In the hydraulic unit 80 hydraulic connections, the fourth and fifth valve arrangements 39, 40 as well as the first and second shut-off valve 33, 35 are moreover accommodated. These are however situated inside the metal body and are therefore not visible.

The hydraulic unit 80 represented in FIG. 6 further comprises hydraulic ports 88, to which the wheel brakes 24*a*, 24*b* and the master cylinder 16 may be connected. Furthermore, one or more accumulators may be mounted on the hydraulic unit 80. Alternatively, ports 88 for one or more accumulators 26 may be provided on the hydraulic unit 80. Finally the control unit 42 may be mounted on the hydraulic unit 80.

In accordance with the provisions of the patent statutes, the principle and mode of operation of this invention have been explained and illustrated in its preferred embodiments.

However, it must be understood that this invention may be practiced otherwise than as specifically explained and illustrated without departing from its spirit or scope.

The invention claimed is:

1. Brake system for a land vehicle, comprising:
   at least one wheel brake to be assigned to a wheel of the land vehicle;
   a pump having a variable capacity, which is configured to deliver hydraulic fluid from its input side to its output side;
   at least one accumulator for receiving hydraulic fluid;
   a hydraulic connection between the accumulator and the input side of the pump;
   at least one first valve arrangement for blocking a hydraulic connection between the output side of the pump and the at least one wheel brake;
   at least one second valve arrangement for blocking a hydraulic connection between the at least one wheel brake and the input side of the pump;
   at least one third valve arrangement for blocking a hydraulic connection between the output side of the pump and the accumulator;
   wherein
   the hydraulic fluid selectively delivered by the pump from the at least one wheel brake directly into the accumulator, with the result that brake pressure in the at least one wheel brake is reduced, and that the hydraulic fluid is selectively delivered from the accumulator into the at least one wheel brake, with the result that brake pressure in the at least one wheel brake is built up, wherein the pressure build-up and the pressure reduction in the at least one wheel brake is controlled by opening or closing the at least one third valve arrangement so that, when the third valve arrangement is open, brake pressure in the at least one wheel brake is reduced and, when the third valve arrangement is closed, brake pressure in the at least one wheel brake is built up.

2. Brake system according to claim 1, wherein the brake system comprises a control unit, which is configured to, during a regenerative braking operation, select switching positions for the valve arrangements and to activate the pump in such a way that the pump delivers hydraulic fluid from the at least one wheel brake to the accumulator, while in an electric machine of the land vehicle a regenerative braking torque is built up in order to convert kinetic energy of the land vehicle to electrical energy.

3. Brake system according to claim 2, wherein the control unit is configured to select the volumetric capacity of the pump and the switching positions of the valve arrangements in such a way that at any time the sum of regenerative braking torque and the braking torque of the at least one wheel brake remains constant or within a tolerance range that is to be selected.

4. Brake system according to claim 2, wherein the control unit is further configured to vary the volumetric capacity of the pump in order to compensate for fluctuations of the regenerative braking torque, in particular to increase the volumetric capacity of the pump in order to compensate for a fall in the regenerative braking torque.

5. Brake system according to claim 2, wherein at least one fourth valve arrangement is provided for blocking a hydraulic connection between a master cylinder and the at least one wheel brake, and wherein the control unit selects the switching position of the at least one fourth valve arrangement in such a way that an actuation of a brake pedal of the land vehicle leads to a volume displacement from the master cylinder to the at least one wheel brake, and that during the build-up of the regenerative braking torque the at least one fourth valve arrangement blocks the hydraulic connection between the master cylinder and the at least one wheel brake.

6. Brake system according to claim 2, wherein the control unit selects the switching position of the valve arrangements in such a way that the delivery of the pump leads in one switching position of the valve arrangements to a reduction of the brake pressure in the at least one wheel brake and in a further switching position of the valve arrangements to an increase of the brake pressure in the at least one wheel brake.

7. Brake system according to claim 1, wherein a first shut-off valve, preferably a non-return valve, is provided for at least one of
blocking a hydraulic connection between the accumulator and the at least one second valve arrangement at least in the direction from the at least one second valve arrangement to the accumulator and
blocking the hydraulic connection between the accumulator and the input side of the pump at least in the direction from the input side of the pump to the accumulator.

8. Hydraulic unit for a brake system comprising
at least one wheel brake to be assigned to a wheel of a land vehicle;
a pump having a variable capacity, which is configured to deliver hydraulic fluid from its input side to its output side;
at least one accumulator for receiving hydraulic fluid, a hydraulic connection between the accumulator and the input side of the pump;
at least one first valve arrangement for blocking a hydraulic connection between the output side of the pump and the at least one wheel brake;
at least one second valve arrangement for blocking a hydraulic connection between the at least one wheel brake and the input side of the pump, and
at least one third valve arrangement for blocking a hydraulic connection between the output side of the pump and the accumulator;
wherein the hydraulic fluid is selectively delivered by the pump from the at least one wheel brake directly into the accumulator, with the result that brake pressure in the at least one wheel brake is reduced, wherein hydraulic fluid is selectively delivered from the accumulator into the at least one wheel brake, with the result that brake pressure in the at least one wheel brake is built up, and wherein the pressure build-up and the pressure reduction in the at least one wheel brake is distinguished by opening or closing the at least one third valve arrangement so that, when the third valve arrangement is open, brake pressure in the at least one wheel brake is reduced and, when the third valve arrangement is closed, brake pressure in the at least one wheel brake is built up, wherein in the hydraulic unit at least one pump having a variable capacity, as well as at least one first valve arrangement, at least one second valve arrangement and at least one third valve arrangement are accommodated,
wherein a hydraulic fluid is selectively delivered by means of the pump from at least one wheel brake directly into an accumulator, with the result that brake pressure in the at least one wheel brake is reduced, and that the hydraulic fluid is selectively delivered from the accumulator into the at least one wheel brake, with the result that brake pressure in the at least one wheel brake is built up, wherein the pressure build-up and the pressure reduction in the at least one wheel brake is distinguished by opening or closing the at least one third valve arrangement so that, when the third valve arrangement is open, brake pressure in the at least one wheel brake is reduced and, when the third valve arrangement is closed, brake pressure in the at least one wheel brake is built up.

9. Method for controlling a brake system, wherein
the brake pressure in at least one wheel brake is reduced by delivering hydraulic fluid by a variable capacity pump from the at least one wheel brake into an accumulator, wherein
at least one second valve arrangement for blocking a hydraulic connection between the at least one wheel brake and an input side of the pump for delivering the hydraulic fluid is situated in let-through position, and
at least one third valve arrangement for blocking a hydraulic connection between an output side of the pump and the accumulator is situated in let-through position, and wherein
the brake pressure in the at least one wheel brake is increased by delivering the hydraulic fluid by a variable capacity pump from the accumulator into the at least one wheel brake, wherein
the at least one third valve arrangement for blocking the hydraulic connection between the output side of the pump and the accumulator is situated in blocking position.

10. Method for controlling a brake system according to claim 9, wherein the brake pressure in at least one wheel brake is reduced, while in an electric machine of the land vehicle a regenerative braking torque is built up in order to convert kinetic energy of the land vehicle to electrical energy.

11. Method for controlling a brake system according to claim 9, wherein during the reduction of the brake pressure in the at least one wheel brake a first shut-off valve for blocking a hydraulic connection between the accumulator and the input side of the pump opens when the brake pressure in the at least one wheel brake falls below a predetermined pressure.

12. Method according to claim 9, wherein a second shut-off valve for blocking a hydraulic connection between a master cylinder and the at least one wheel brake opens and the rotational speed of the pump is reduced when the brake pressure in the master cylinder exceeds a predetermined pressure.

* * * * *